(12) United States Patent
Kim et al.

(10) Patent No.: US 10,518,239 B2
(45) Date of Patent: *Dec. 31, 2019

(54) APPARATUS FOR MANUFACTURING AEROGEL SHEET

(71) Applicant: LG CHEM, LTD., Seoul (KR)

(72) Inventors: Ye Hon Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,438

(22) Filed: Apr. 4, 2019

(65) Prior Publication Data
US 2019/0275489 A1    Sep. 12, 2019

Related U.S. Application Data

(63) Continuation of application No. 15/570,693, filed as application No. PCT/KR2017/001220 on Feb. 3, 2017, now Pat. No. 10,293,324.

(30) Foreign Application Priority Data

Feb. 16, 2016    (KR) .................... 10-2016-0018000

(51) Int. Cl.
   *B01J 13/00*    (2006.01)
   *B01J 19/24*    (2006.01)
   (Continued)

(52) U.S. Cl.
   CPC ......... *B01J 13/0091* (2013.01); *B01J 19/249* (2013.01); *B01J 27/24* (2013.01); *B01J 31/02* (2013.01); *B01J 31/0202* (2013.01); *B01J 35/12* (2013.01); *B01J 37/04* (2013.01); *B05C 3/09* (2013.01); *C01B 33/158* (2013.01); *C01B 33/1585* (2013.01); *D06B 5/22* (2013.01); *D06M 11/60* (2013.01); *D06M 13/507* (2013.01); *B01J 2219/245* (2013.01); *B01J 2219/246* (2013.01); *B01J 2219/247* (2013.01);
   (Continued)

(58) Field of Classification Search
   CPC .... B01J 16/00; B01J 13/0091; B01J 13/0095; B01J 3/03; B01J 19/24; C01B 33/1585; C01B 33/163
   See application file for complete search history.

(56) References Cited

U.S. PATENT DOCUMENTS

| 126,424 A | 5/1872 | Stowe |
| 2,512,747 A | 6/1950 | Lewis |

(Continued)

FOREIGN PATENT DOCUMENTS

| JP | 2011-178925 A | 9/2011 |
| JP | 2011190551 A | 9/2011 |

(Continued)

*Primary Examiner* — Lessanework Seifu
(74) *Attorney, Agent, or Firm* — Dentons US LLP

(57) ABSTRACT

The present invention relates to an apparatus of manufacturing an aerogel sheet. The apparatus of manufacturing the aerogel sheet includes: a plurality of fixing vessels into which a fiber sheet is inserted; and an impregnation vessels provided with an accommodation part in which the plurality of fixing vessels are stacked in multistage and a silica precursor injection part which injects a silica precursor into the accommodation part to impregnate the silica precursor into the fiber sheet inserted into each of the fixing vessels.

5 Claims, 6 Drawing Sheets

(51) Int. Cl.

| | | |
|---|---|---|
| *B01J 37/04* | (2006.01) | |
| *B01J 31/02* | (2006.01) | |
| *C01B 33/158* | (2006.01) | |
| *B01J 27/24* | (2006.01) | |
| *B01J 35/12* | (2006.01) | |
| *B05C 3/09* | (2006.01) | |
| *D06B 5/22* | (2006.01) | |
| *D06M 11/60* | (2006.01) | |
| *D06M 13/507* | (2006.01) | |

(52) U.S. Cl.
CPC ...... *B01J 2219/2453* (2013.01); *B01J 2219/2458* (2013.01); *B01J 2219/2496* (2013.01); *D06M 2400/02* (2013.01)

(56) References Cited

U.S. PATENT DOCUMENTS

| | | |
|---|---|---|
| 5,527,516 A | 6/1996 | Yamamoto et al. |
| 2005/0046086 A1 | 3/2005 | Lee et al. |
| 2005/0167891 A1 | 8/2005 | Lee et al. |
| 2005/0178061 A1 | 8/2005 | Tonca |
| 2008/0093016 A1 | 4/2008 | Lee et al. |
| 2010/0012504 A1 | 1/2010 | Tonca |
| 2014/0050658 A1 | 2/2014 | Wyttenbach et al. |
| 2014/0323589 A1 | 10/2014 | Lazar et al. |

FOREIGN PATENT DOCUMENTS

| | | |
|---|---|---|
| JP | 2014076548 A | 5/2014 |
| KR | 10-2010-0053350 A | 5/2010 |
| KR | 10-2011-0032582 A | 3/2011 |
| KR | 20110126381 A | 11/2011 |
| KR | 101105436 B1 | 1/2012 |
| KR | 101199958 B1 | 11/2012 |
| KR | 10-2014-0037512 A | 3/2014 |
| KR | 20150089319 A | 8/2015 |
| WO | 2012/150185 A1 | 11/2012 |
| WO | 2013/061104 A2 | 5/2013 |
| WO | 2017/126870 A1 | 7/2017 |

APPARATUS FOR MANUFACTURING AEROGEL SHEET

CROSS-REFERENCE TO RELATED APPLICATION

This application is a Continuation of U.S. patent application Ser. No. 15/570,693, filed Oct. 30, 2017, now allowed, which is the U.S. National Phase application of International Application No. PCT/KR2017/001220, filed on Feb. 3, 2017, which claims the benefit of Korean Patent Application No. 10-2016-0018000, filed on Feb. 16, 2016, all of which are hereby incorporated by reference in their entirety for all purposes as if fully set forth herein.

TECHNICAL FIELD

The present invention relates to an apparatus of manufacturing an aerogel sheet, and more particularly, to an apparatus of manufacturing an aerogel sheet, which significantly improves productivity of the aerogel sheet.

BACKGROUND ART

In general, aerogel sheet is a high porosity material having high porosity of about 90% to about 99% in solids that are known up to date. A silica precursor solution is subjected to sol-gel polymerization reaction to from gel, and then, drying process is performed on the formed gel under supercritical or atmospheric conditions to obtain the aerogel. That is, aerogel has a pore structure filled with air.

The above-described aerogel sheet is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m·k or less, which is significantly lower than thermal conductivity of 36 mW/m·k that is thermal conductivity of an organic insulation material such as conventional Styrofoam and the like.

DISCLOSURE OF THE INVENTION

Technical Problem

The aerogel sheet according to the related art is manufactured by injecting and impregnating an aerogel and a catalyst solution into a surface of a blanket.

However, the aerogel sheet according to the related art may be complicated in manufacturing process to deteriorate workability and productivity.

The present invention has been made to solve the above-mentioned problems, and an object of the prevent invention is to provide an apparatus of manufacturing an aerogel sheet, which simplifies a process of manufacturing the aerogel sheet to improve workability and productivity.

Technical Solution

To achieve the above-described object, an apparatus of manufacturing an aerogel sheet includes: a plurality of fixing vessels into which a fiber sheet is inserted; and an impregnation vessels provided with an accommodation part in which the plurality of fixing vessels are stacked in multistage and a silica precursor injection part which injects a silica precursor into the accommodation part to impregnate the silica precursor into the fiber sheet inserted into each of the fixing vessels.

The accommodation part may be provided as a sealed vacuum chamber, and the silica precursor injection part may be provided in plurality on a circumferential surface of the vacuum chamber in a height direction.

Each of the fixing vessels may have a box shape with an upper portion opened, and a plurality of punched holes may be defined in a bottom surface of the fixing vessel.

The impregnation vessel may further include a vacuum generation part which discharges air in the accommodation part to the outside to allow the silica precursor to ascend through suction force and thereby to improve impregnation of the silica precursor into the fiber sheet.

The apparatus may further include a silica precursor supply vessel supplying the silica precursor to the silica precursor injection part.

The silica precursor may be prepared by mixing silica sol with a gelling catalyst.

The silica sol may be prepared by mixing tetraethyl orthosilicate (TEOS) with ethanol.

The tetraethyl orthosilicate (TEOS) may include hydrolyzed TEOS.

The gelling catalyst may be prepared by mixing ethanol with ammonia water ($NH_4OH$).

The apparatus may further include a reaction vessel in which the plurality of fixing vessels withdrawn from the impregnation vessel are accommodated to be stacked vertically, and the fiber sheet inserted in each of the fixing vessels may be aged, surface-modified, and dried at a high temperature.

Advantageous Effects

The apparatus of manufacturing the aerogel sheet according to the present invention may include the fixing vessel into which the fiber sheet is inserted and the impregnation vessel in which the plurality of fixing vessels are stacked in the multistage to impregnate the plurality of fiber sheets at once, and thus, the aerogel sheet may be mass-produced to improve the productivity.

In the apparatus of manufacturing the aerogel sheet according to the present invention, the plurality of silica precursor injection parts may be provided in the impregnation vessel to improve the impregnation of the silica precursor into the fiber sheet.

In the apparatus of manufacturing the aerogel sheet according to the present invention, the punched hole may be defined in the bottom surface of the fixing vessel to introduce the silica precursor through the bottom surface of the fixing vessel, thereby improving the impregnation of the silica precursor into the fiber sheet.

The apparatus of manufacturing the aerogel sheet according to the present invention may include the vacuum generation part in the reaction vessel to improve the impregnation of the silica precursor into the fiber sheet through the suction force.

MODE FOR CARRYING OUT THE INVENTION

Figure 1:
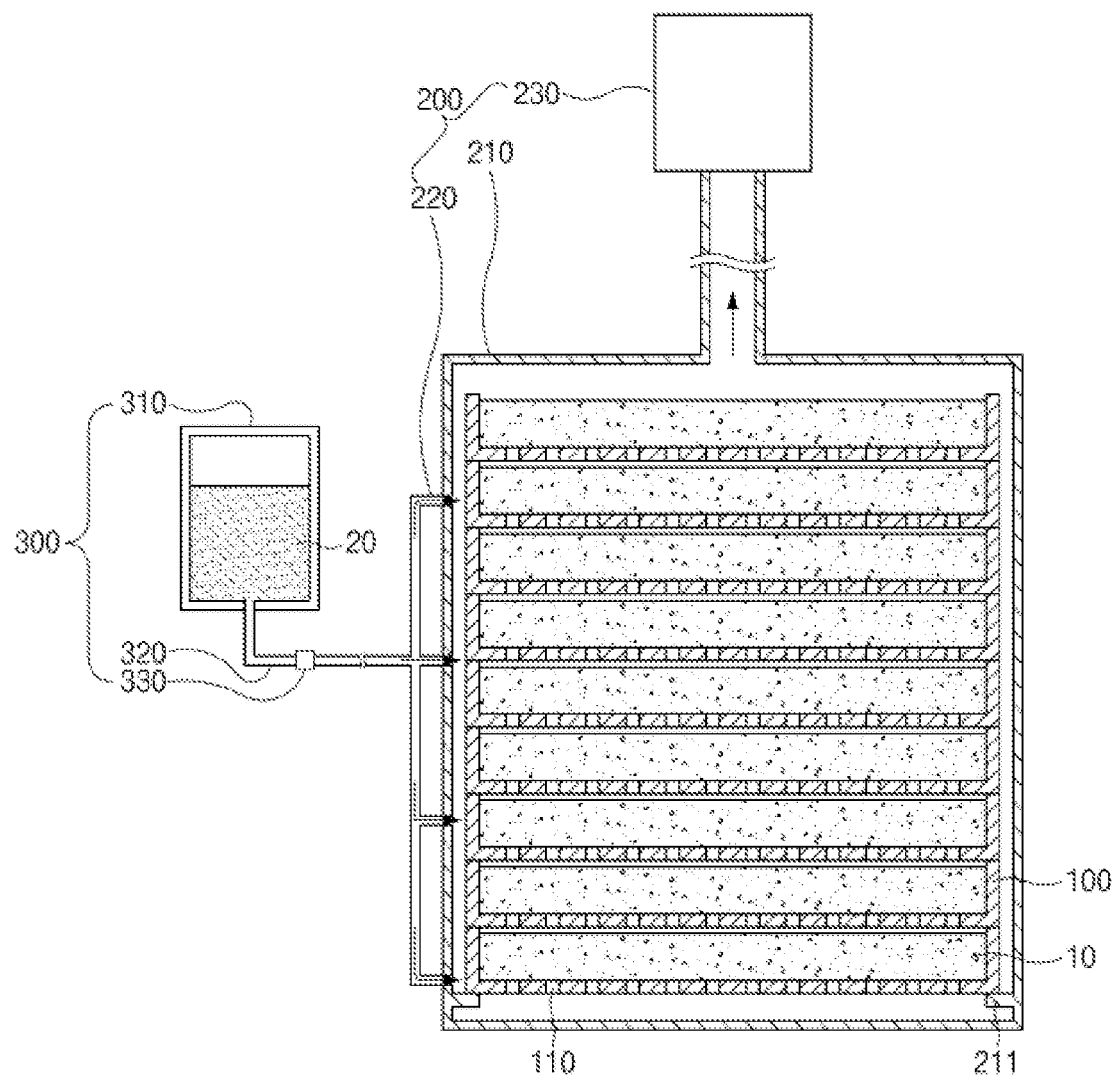
FIG. 1 is a view illustrating an apparatus of manufacturing an aerogel sheet according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

An apparatus of manufacturing an aerogel sheet according to the present invention has a structure in which a plurality of fiber sheets are impregnated, aged, surface-modified, and dried at once to mass-produce the aerogel sheets having the same quality, thereby improving productivity and workability.

That is, as illustrated in FIG. 1, the apparatus of manufacturing the aerogel sheet according to the present invention includes a plurality of fixing vessels 100 into which a fiber sheet 10 is inserted, an impregnation vessel 200 in which the plurality of fixing vessels 100 are accommodated to be stacked in multistage, and a silica precursor 20 is impregnated into the fiber sheet 10, and a reaction vessel 400 in which the fixing vessels 100 unloaded from the impregnation vessel 200 are accommodated to be stacked in the multistage, and the fiber sheet 10 is aged, surface-modified, and dried.

Fixing Vessel

Figure 2:
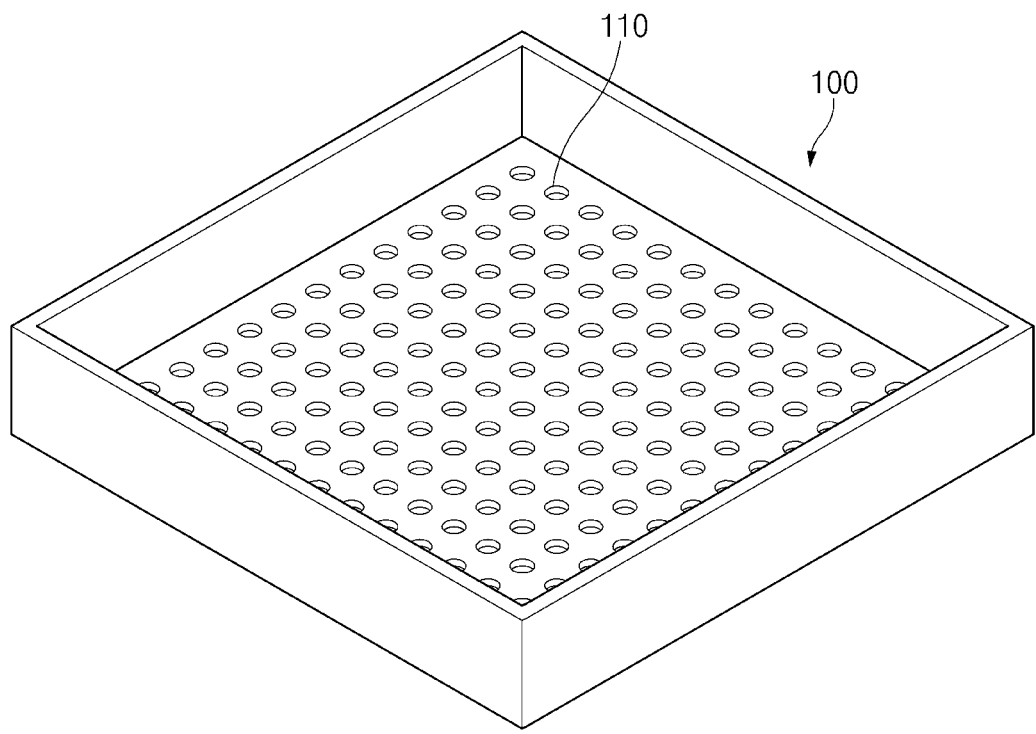
FIG. 2 is a perspective view of a fixing vessel according to the present invention.

As illustrated in FIG. 2, the fixing vessel 100 has a box shape with an upper portion opened so that the fiber sheet 10 is inserted.

Also, a plurality of punched holes 110 that are penetrated downward are defined in the bottom surface of the fixing vessel 100. Thus, the silica precursor may be introduced to the bottom surface of the fixing vessel 100 through the punched holes 110 to improve the impregnation of the silica precursor into the fiber sheet.

Here, the fixing vessel 100 may improve the impregnation of the silica precursor into the fiber sheet 10 through various embodiments.

Figure 3:
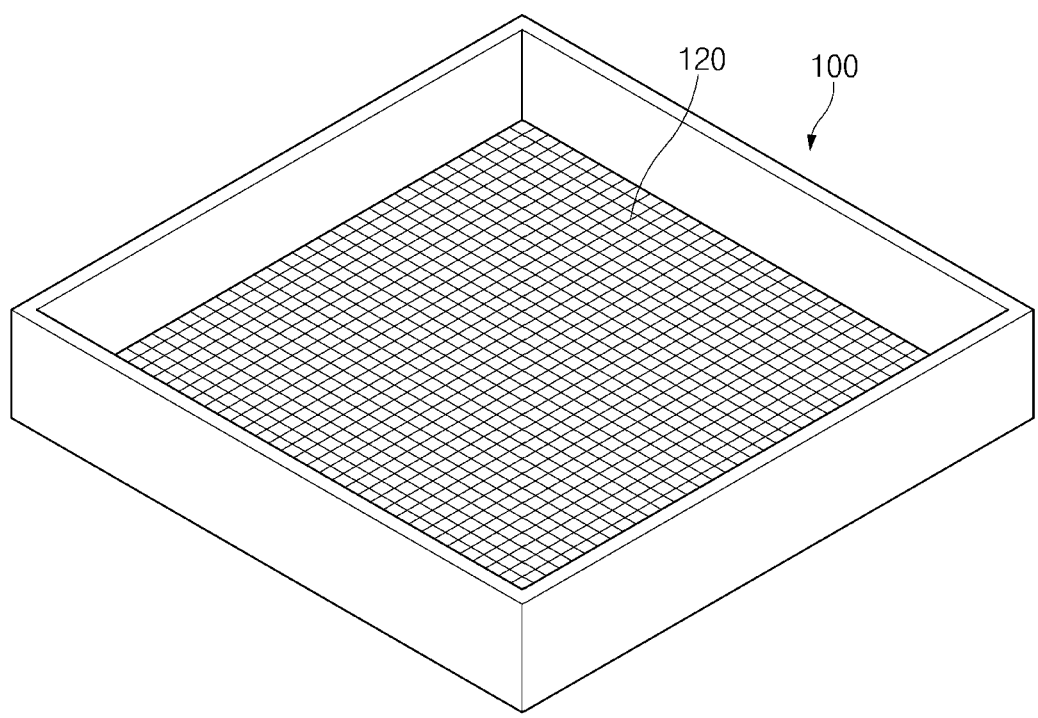
FIGS. 3 to 5 are views of a fixing vessel according to another embodiment of the present invention.

According to a first embodiment, as illustrated in FIG. 3, the bottom surface of the fixing vessel 100 may be provided as a mesh net 120. Thus, an inflow amount of silica precursor introduced from the bottom surface of the fixing vessel 100 through the mesh net 120 may increase to improve the impregnation of the silica precursor 20 into the fiber sheet 10.

Figure 4:
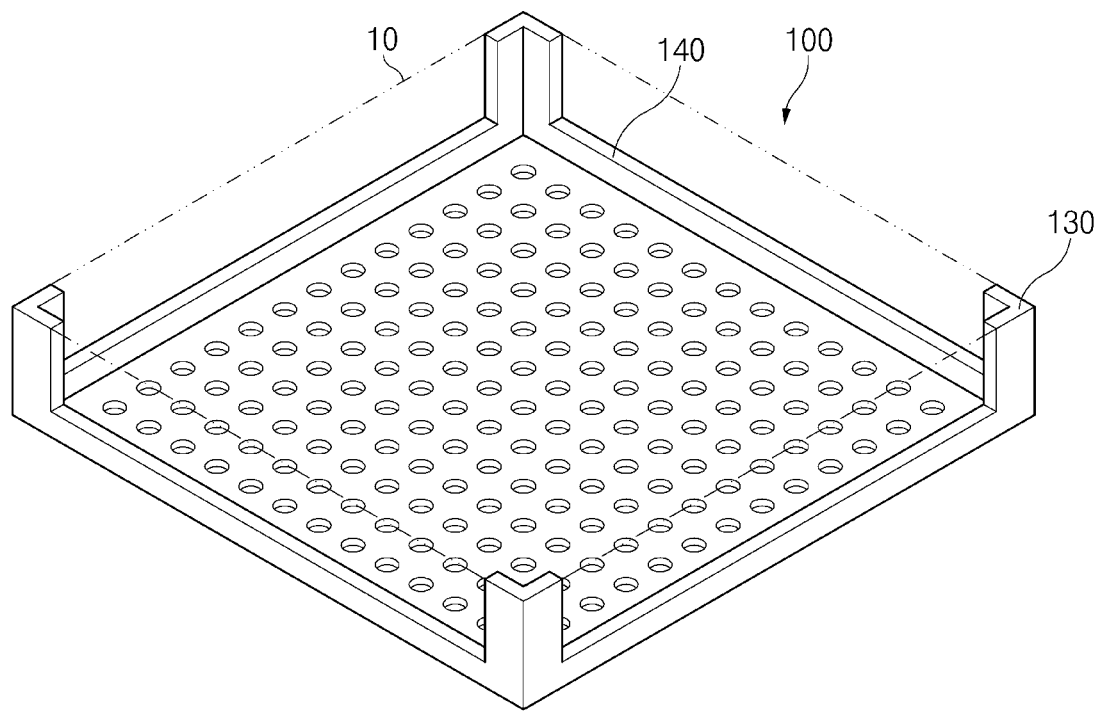

According to a second embodiment, as illustrated in FIG. 4, a sidewall of the fixing vessel 100 may be provided as a through-groove 140 that is opened outward except for a support part 130 supporting a side surface of the fiber sheet 10. Thus, an inflow amount of the silica precursor may increase through the through-groove 140 to improve the impregnation of the silica precursor 20 into the fiber sheet 10.

Figure 5:
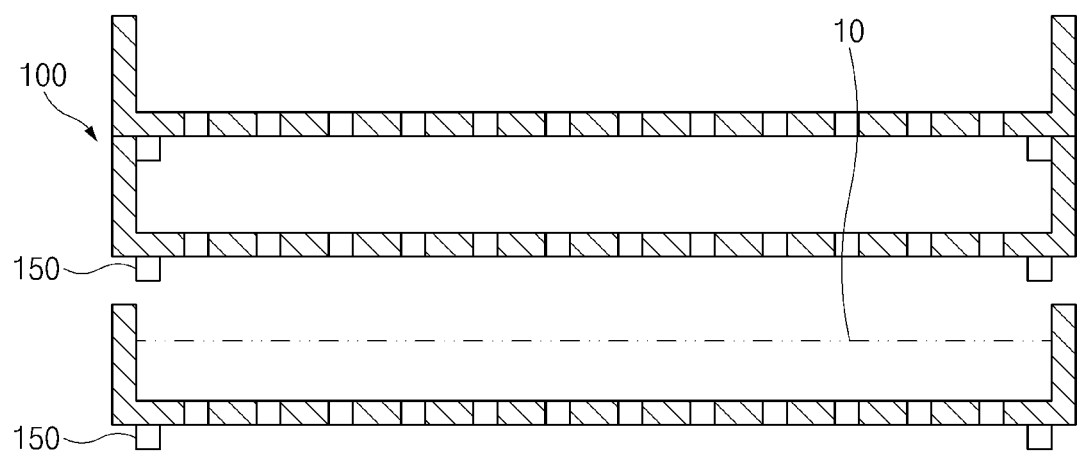
Figure 6:
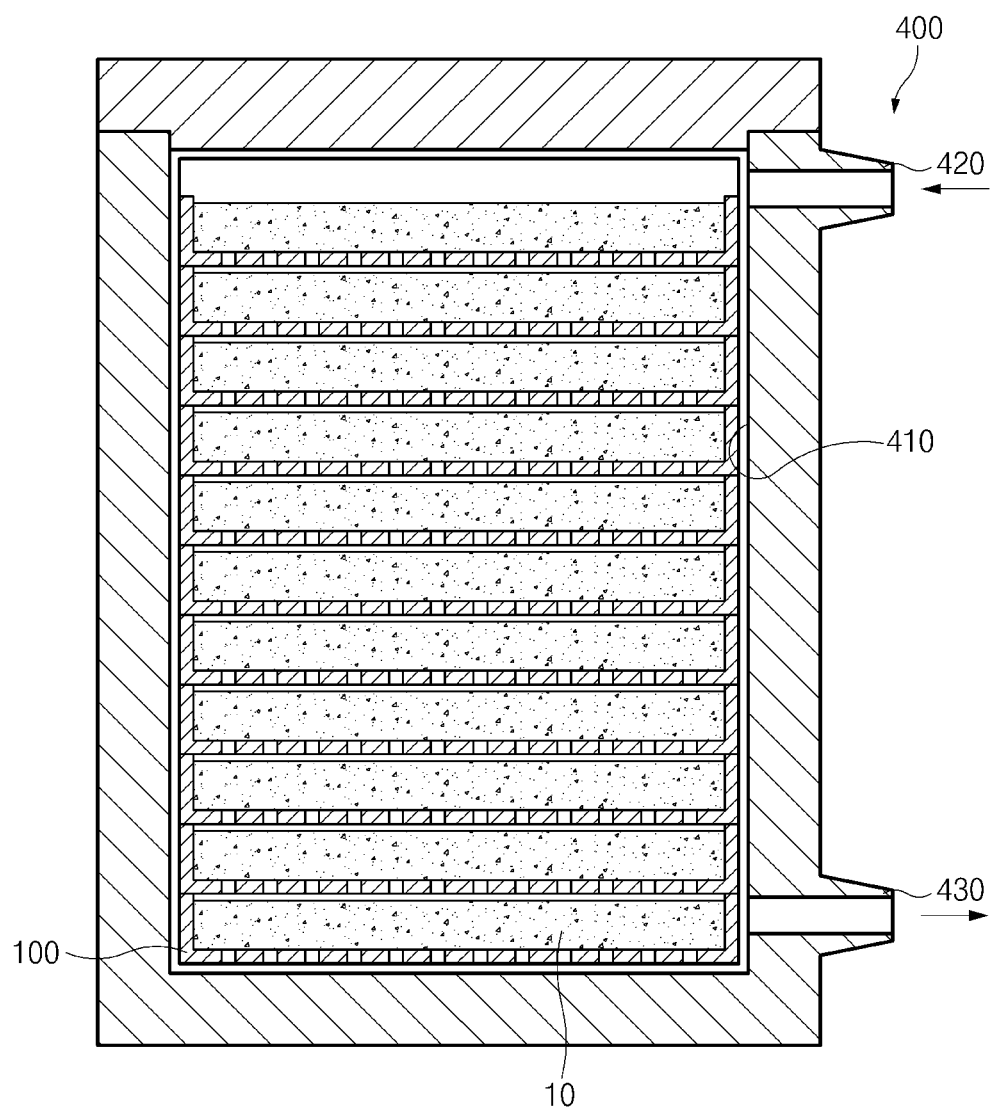
FIG. 6 is a view of a reaction vessel according to the present invention.

According to a third embodiment, the fixing vessels 100 stacked in the multistage may be provided so that the fixing vessels corresponding to each other are fitted and coupled to each other. That is, as illustrated in FIG. 5, a coupling protrusion 150 is provided so that the bottom surface of the fixing vessel 100, which is disposed at an upper side, of the fixing vessels that are closely attached to each other is coupled to an opening of the fixing vessel 100, which is disposed at a lower side. Thus, the fixing vessels 100 stacked in the multistage may be stably stacked.

Impregnation Vessel

Referring to FIG. 1, an impregnation vessel 200 includes an accommodation part 210 in which the plurality of fixing vessels 100 are accommodated to be stacked in the multistage and a silica precursor injection part 220 that injects the silica precursor 20 into the accommodation part 210 to impregnate the silica precursor 20 into the fiber sheet 10 inserted into the fixing vessel 100.

The accommodation part 210 has an accommodation space in which the plurality of fixing vessels 100 are accommodated. Also, the vacuum generation part 230 is coupled to a top surface of the accommodation part 210, and the silica precursor injection part 220 is coupled to a side surface of the accommodation part 210.

The accommodation part 210 may be provided as a sealed vacuum chamber to improve the impregnation of the silica precursor 20 into the fiber sheet 10 by using a vacuum state.

A support plate 211 spaced a predetermined height from the bottom surface may be disposed on the bottom of the accommodation space of the accommodation part 210. The support plate 211 may space the fixing vessels 100 stacked on the lower ends of the accommodation part 210 from the bottom surface of the accommodation space to improve the impregnation of the silica precursor into the fiber sheet 10 inserted into the lowermost fixing vessel 100.

Also, the accommodation part 210 may have a box shape with a sealed structure. Thus, the fixing vessels 100, each of which has the box shape, may be stacked without being shaken.

The silica precursor injection part 220 may be provided in plurality on a circumferential surface of the accommodation part 210 in a height direction. The plurality of silica precursor injection parts 220 may be connected to a silica precursor supply vessel 300 in a state in which the plurality of silica precursor injection parts 220 are integrally connected to each other.

That is, referring to FIG. 1, the silica precursor injection parts 220 may inject the silica precursor 20 into an upper end, a lower end, and a middle end between the upper end and the lower end of the accommodation part 210 to supply the silica precursor 20 into the plurality of fixing vessels 100 stacked in the accommodation part 210, thereby achieving uniform impregnation.

The silica precursor injection part 220 may be further provided in a circumferential direction as well as the height direction of the accommodation part 210. Thus, the silica precursor 20 may be supplied to the entire accommodation part 210.

The silica precursor 20 injected into the accommodation part 210 through the silica precursor injection part 220 may drop to the bottom surface of the accommodation part 210. Thus, a difference in impregnation between the fiber sheet 10 of the fixing vessel 100 disposed at the upper end of the accommodation part 210 and the fiber sheet 10 of the fixing vessel 100 disposed at the lower end of the accommodation part 210 may occur to cause defective products.

To solve the above-described problems, in the apparatus of manufacturing the aerogel sheet according to the present invention, the silica precursor 20 accommodated in the accommodation part 210 may move from one side to the other side to uniform adjust the impregnation of the silica precursor into the fiber sheets 10 inserted into the plurality of fixing vessels 100.

That is, the impregnation vessel 200 includes the vacuum generation part 230 discharging internal air of the accommodation part 210 to the outside to generate suction force. Since the vacuum generation part 230 discharges the internal air of the accommodation part 210 to the outside, the silica precursor 20 accumulated on the bottom surface of the accommodation part 210 may forcibly ascend up to the upper end of the accommodation part 210, at which the vacuum generation part 230 is disposed. Here, the silica precursor 20 accumulated on the bottom surface of the accommodation part 210 may pass through the fiber sheet 10 of the uppermost fixing vessel 100 through the fiber sheet 10 of the lowermost fixing vessel 100.

Thus, the apparatus of manufacturing the aerogel sheet according to the present invention may include the vacuum generation part 230 to improve the impregnation of the silica precursor 20 into the fiber sheets 10 inserted into the fixing vessels stacked in the multistage, and particularly, uniformize the impregnation.

The apparatus of manufacturing the aerogel sheet according to the present invention includes the silica precursor supply vessel 300 supplying the silica precursor 20 to the silica precursor injection part 220.

Silica Precursor Supply Vessel

The silica precursor supply vessel 300 is configured to prepare and supply the silica precursor and includes a supply part 310 in which the silica precursor 20 is accommodated and a connection line 320 connecting the supply part 310 to the silica precursor injection part 220. A pump 330 adjusting a supply amount of silica precursor passing through the connection line 320 is provided in the connection line 320.

Here, the silica precursor 20 is prepared by mixing silica sol with a gelling catalyst. The silica sol is prepared by mixing tetraethyl orthosilicate (TEOS) with ethanol, and the gelling catalyst is prepared by mixing ethanol with ammonia water ($NH_4OH$).

Here, a hydrolyzed solvent having high reactivity with water may be used as the TEOS to more improve reactivity. That is, the hydrolyzed TEOS and the ethanol may be mixed to obtain the silica sol having excellent reactivity.

As described above, the silica precursor supply vessel 300 may be provided to supply the silica precursor 20 to the impregnation vessel 200, thereby stably supplying the silica precursor.

When the impregnation of the silica precursor 20 into the fiber sheet 10 is completed by the impregnation vessel 200, the fiber sheet 10 into which the silica precursor is impregnated is aged, surface-modified, and dried to prepare an aerogel sheet. Here, a reaction vessel 400 is used.

Reaction Vessel

As illustrated in FIG. 4, the reaction vessel 400 has an accommodation space 410 in which the plurality of fixing vessels 100 are accommodated, an injection hole 420 having one end connected to the accommodation space 410, and a discharge hole 430 having the other end connected to the accommodation part 410.

That is, the reaction vessel 400 may rise an inner temperature of the accommodation space 410 through the injection hole 420 in a state in which the plurality of fixing vessels 100 are accommodated to be stacked in the multistage in the accommodation space 410 to perform the aging, thereby uniformizing tissues of the fiber sheet 10. Also, hexamethyldisilazane (HMDS) may be injected into the accommodation space 410 through the injection hole 420 to modify a surface of the fiber sheet 10. Also, a temperature of the accommodation space 410 may be adjusted in multistage through the injection hole 420 to dry the fiber sheet 10. The ethanol discharged from the fiber sheet through the discharge hole 430 may be discharged to the outside to prevent defects of the fiber sheet 10 from occurring.

As described above, in the apparatus of manufacturing the aerogel sheet according to the present invention, the silica precursor is impregnated into the plurality of fiber sheets 10 at once to mass-produce the aerogel sheet, thereby significantly improving the productivity.

A use state of the apparatus of manufacturing the aerogel sheet, which includes the above-described constituents, according to the present invention will be described as follows.

First, the fiber sheet 10 is inserted into each of the plurality of fixing vessels 100. Here, the plurality of punched holes 110 are formed in the bottom surface of each of the fixing vessels 100.

Next, the fixing vessels 100 into which the fiber sheet 10 is inserted are stacked in the multistage in the accommodation part 210 of the impregnation vessel 200. When the staking of the fixing vessels 100 is completed, the accommodation part 210 is sealed.

Next, the silica precursor stored in the silica precursor supply vessel 300 is injected into the accommodation part 210 through the silica precursor injection part 220 of the impregnation vessel 200. Here, while the silica precursor is injected through the plurality of silica precursor injection parts 220, the impregnation of the silica precursor 20 into the fiber sheet 10 may be improved.

The fiber sheets 10 of the fixing vessels 100 stacked in the multistage may not be uniformly impregnated only by injecting the silica precursor 20. Thus, the vacuum generation part 230 may operate to allow the silica precursor 20 accumulated on the lower portion of the accommodation part 210 to forcibly ascend upward. Here, the silica precursor 20 may pass from the fiber sheet 10 of the lowermost fixing vessel 100 to the fiber sheet 10 of the uppermost fixing vessel 100 to improve the impregnation. Particularly, the uniformity may be improved.

Here, the punched hole 110 may be formed in the bottom surface of the fixing vessel 100 to improve the impregnation of the silica precursor 20 into the fiber sheet 10.

When the impregnation of the silica precursor 20 into the fiber sheet 10 is completed, the plurality of fixing vessels 100 are withdrawn from the impregnation vessel 200 and then accommodated into the reaction vessel 400.

Then, while the inner temperature of the reaction vessel 400 increases, the tissues of the fiber sheet 10 may be uniformized. Then, the hexamethyldisilazane (HMDS) may be injected into the reaction vessel 400 to modify the surface of the fiber sheet 10, and the temperature of the reaction vessel 400 may be adjusted in multistage to dry the fiber sheet 10, thereby obtaining the silica sol sheet that is a finished product.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing an aerogel sheet, the apparatus comprising:
a plurality of fixing vessels into which a fiber sheet is inserted; and
an impregnation vessel accommodating the plurality of fixing vessels;
wherein the impregnation vessel comprises:
an accommodation part in which the plurality of fixing vessels are stacked;
a silica precursor injection part which injects a silica precursor into the accommodation part; and
a vacuum generation part which discharges air in the accommodation part to the outside to allow the silica precursor to ascend through suction force to improve impregnation of the silica precursor into the fiber sheet.

2. The apparatus of claim 1, wherein the accommodation part is provided as a sealed vacuum chamber, and the silica precursor injection part is provided in plurality on a circumferential surface of the vacuum chamber in a height direction.

3. The apparatus of claim 1, wherein each of the plurality of fixing vessels has a box shape with an upper portion opened, and a plurality of punched holes defined in a bottom surface of the fixing vessel.

4. The apparatus of claim 1, further comprising a silica precursor supply vessel supplying the silica precursor to the silica precursor injection part.

5. The apparatus of claim 1, further comprising a reaction vessel in which the plurality of fixing vessels withdrawn from the impregnation vessel are accommodated to be stacked vertically, and the fiber sheet inserted in each of the fixing vessels is aged, surface-modified, and dried at a high temperature.

* * * * *